(12) United States Patent
Morimoto et al.

(10) Patent No.: US 6,469,402 B2
(45) Date of Patent: Oct. 22, 2002

(54) CONTROL APPARATUS FOR HYBRID VEHICLE

(75) Inventors: Kazuhiko Morimoto; Yoshiaki Omata, both of Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/825,195

(22) Filed: Apr. 3, 2001

(65) Prior Publication Data

US 2002/0021007 A1 Feb. 21, 2002

(30) Foreign Application Priority Data

Apr. 5, 2000 (JP) .................................... 2000-103016

(51) Int. Cl.[7] ............................................. F02H 11/00
(52) U.S. Cl. ....................... 290/40 C; 180/65.2; 318/139
(58) Field of Search ............................. 290/40 C, 40 B, 290/40 R; 180/65.2; 318/139

(56) References Cited

U.S. PATENT DOCUMENTS

| | | | |
|---|---|---|---|
| 5,343,970 A | 9/1994 | Severinsky | 180/65.2 |
| 5,495,906 A | 3/1996 | Furutani | 180/65.2 |
| 5,632,238 A | 5/1997 | Furukawa et al. | 123/179.3 |
| 5,762,156 A | 6/1998 | Bates et al. | 180/165 |
| 5,839,533 A | 11/1998 | Mikami et al. | 180/165 |
| 5,841,201 A | 11/1998 | Tabata et al. | 290/40 C |
| 5,895,333 A | 4/1999 | Morisawa et al. | 475/5 |
| 5,927,415 A | 7/1999 | Ibaraki et al. | 180/65.2 |
| 5,935,040 A | 8/1999 | Tabata et al. | 477/3 |
| 5,960,897 A | 10/1999 | Furuya et al. | 180/65.4 |
| 6,018,199 A | 1/2000 | Shiroyama et al. | 290/37 A |
| 6,176,807 B1 | 1/2000 | Oba et al. | 477/5 |
| 6,054,776 A | 4/2000 | Sumi | 290/17 |
| 6,110,066 A | 8/2000 | Nedungadi et al. | 475/5 |
| 6,116,364 A | 9/2000 | Taguchi et al. | 180/65.2 |
| 6,316,842 B1 * | 11/2001 | Kuroda et al. | 180/65.4 |
| 6,334,499 B1 * | 1/2002 | Matsubara et al. | 180/65.2 |
| 6,335,574 B1 * | 1/2002 | Ochiai et al. | 290/17 |
| 6,345,216 B1 * | 2/2002 | Morimoto et al. | 180/337 |
| 6,362,580 B1 * | 3/2002 | Omata et al. | 180/65.3 |
| 6,373,206 B1 * | 4/2002 | Morimoto et al. | 123/179.1 |
| 2001/0028233 A1 * | 10/2001 | Omata et al. | 318/445 |
| 2002/0019687 A1 * | 2/2002 | Suzuki et al. | 701/22 |

FOREIGN PATENT DOCUMENTS

| | | |
|---|---|---|
| JP | 9-71138 | 3/1997 |
| JP | 2000-13911 | 1/2000 |

OTHER PUBLICATIONS

U.S. patent application Ser. No. 09/523,209, filed Mar. 10, 2000, *Controller of Vehicle Propulsion System*.

U.S. patent application Ser. No. 09/539,424, filed Mar. 30, 2000, *Motor Drive Control Apparatus*.

U.S. patent application Ser. No. 09/539,000, filed Mar. 30, 2000, *Motor Drive Controller for Vehicle*.

* cited by examiner

*Primary Examiner*—Nicholas Ponomarenko
(74) *Attorney, Agent, or Firm*—Flynn, Theil, Boutell & Tanis, P.C.

(57) ABSTRACT

A control apparatus is provided for a hybrid vehicle having an engine and a electric motor disposed therein. The electric motor has both driving and power-generating functions and is directly connected to the engine mounted on the hybrid vehicle. The control apparatus controls both driving and power-generating states of the motor based on a driving state of the hybrid vehicle and a driving state of the engine, and controls to automatically start up and stop the engine according to an automatic startup condition and an automatic stop condition. The engine automatically stops after the automatic stop condition is satisfied while the control means controls the motor so as to execute a recharging power-generating drive to recharge the vehicle battery. As a result, this system can prevent discharge of unburned combustible gas when automatically stopping a vehicle, can improve sensations in the vehicle during stopping, and can improve start-up performance.

2 Claims, 7 Drawing Sheets

FIG. 2

SWITCHOVER/REMOVE CONDITION OF ENGINE FORCIBLE STOP CONTROL MODE

| CONTROL ITEM | | VEHICLE VELOCITY | MOTOR SPEED | CLUTCH SW1 | CLUTCH SW2 | BRAKE SW | IDLE SW | STARTER SW | IS-SW | ENGINE WATER TEMPERATURE | PROHIBITING FLAG | NOTE |
|---|---|---|---|---|---|---|---|---|---|---|---|---|
| ENGINE FORCIBLE STOP CONTROL | SWITCH-OVER | 2 km/h BELOW | 400~1000 rpm | OFF | ON | — | ON | OFF | ON | — | SEE LOWER PART | NO BATTERY ADMINISTRATION |
| | REMOVE | 3 km/h MORE THAN | 300 rpm BELOW | ON | — | — | OFF | ON | OFF | — | | |

FIG. 3

TABLE OF FORCIBLE STOP/POWER GENERATING CONTROL

| ROTATIONAL SPEED (rpm) | 200 | 300 | 400 | 500 | 600 | 800 | 900 | 1000 |
|---|---|---|---|---|---|---|---|---|
| TORQUE ORDER (rpm) | 0 | −10 | −30 | −50 | −50 | −50 | −50 | −30 |

CONTROL APPARATUS FOR HYBRID VEHICLE

FIELD OF THE INVENTION

This invention relates to a control apparatus for a hybrid vehicle which can prevent discharge of unburned combustible gas when automatically stopping a vehicle, can improve a feeling or sensation during stopping of the vehicle, and can improve start-up performance.

BACKGROUND OF THE INVENTION

Some motor vehicles are of a type commonly called a hybrid vehicle having an internal combustion engine and an electric motor disposed therein as the power sources of a propulsion system. The engine mounted on the hybrid vehicle is provided to directly connect with an electrical motor having a vehicle driving function and an electrical power generating function. The hybrid vehicle has a motor control apparatus to control both driving and power-generating states of the motor based on a driving state of the hybrid vehicle and a driving state of the engine.

In a hybrid vehicle, there is a control apparatus to control so as to automatically start up and stop during driving of engine. The control apparatus of a hybrid vehicle controls to automatically stop the engine when an automatic stop condition without pressing of an accelerator pedal is satisfied. The control apparatus controls to automatically start up the vehicle when automatic starting-up condition is satisfied.

One such example of a control apparatus of a hybrid vehicle is disclosed in published Japanese Application Laid-Open No. 9-71138.

The control apparatus for a hybrid vehicle indicated in this disclosure, includes a gearing means in a power transmission system from an internal combustion engine to a wheel, a power-generating/electrically-powered means, and an automatic start-up/stop control means. Incidentally, in the automatic start-up/stop control means, when a predetermined condition is satisfied at vehicle stop, then an internal combustion engine is stopped, and at re-start, an internal combustion engine is started up. Furthermore, at restart, the control apparatus has an engine rotational-speed restraining control means to control power-generating/electrically-powered means so as to restrain a rise of rotational speed of an internal combustion engine.

A control apparatus, when automatically stopping an engine of a hybrid vehicle, executes a stop processing that is stopping the supply of fuel to an engine.

However, an engine does not promptly stop even if the supply of fuel is stopped, and stops while running at idle by inertia. For this reason, while the engine idles, the fuel sticking in an inner wall of an intake port of the engine is drawn into a cylinder. Therefore, as an air-fuel ratio of fuel drawn into the cylinder while the engine idles becomes unsuitable, the fuel is drained in an incomplete combustion state or as an unburned combustible gas.

Accordingly, there is inconvenience and a problem in that effluent gas performance is deteriorated because the engine drains unburned combustible gas when the engine automatically stops. In addition, because the engine idles and does not stop quickly, the time period until an engine stops becomes long, and a sensation or feeling in the vehicle during stopping is undesirable. Furthermore, as a residual quantity of fuel in an intake port during running-idle decreases, there are inconveniences or waste in that fast explosion at a restart is delayed, and starting-up performance is deteriorated.

In order to obviate or minimize the above problem or inconvenience, the present invention provides a control apparatus for a hybrid vehicle having an engine and a electric motor disposed therein. The electric motor has both driving and recharging power-generating functions and is directly connected to the engine mounted on the hybrid vehicle. A control apparatus for the hybrid vehicle controls both driving and power-generating states of the motor based on a driving state of the hybrid vehicle and a driving state of the engine. The control apparatus automatically starts up and stops the engine according to an automatic start-up condition and an automatic stop condition, wherein when the engine automatically is stopping after the automatic stop condition is satisfied, the control means controls the motor so as to execute power-generating drive.

The control apparatus of the hybrid vehicle of this invention, when automatically stopping the engine after automatic stop condition is satisfied, controls the motor so as to execute a power-generating drive. Then, at automatic stop of the engine, by power-generating drive of the motor, the engine is given a load corresponding to an engine rotational speed. Accordingly, the engine cannot run to idle by inertia. Therefore, this arrangement can decrease the fuel sticking in an intake port of an engine that is drawn into a cylinder, and can retain the fuel in the intake port.

BRIEF DESCRIPTION OF THE DRAWINGS

FIG. 2 is an illustration showing a switchover/remove condition for an engine forcible stop control mode;

FIG. 3 is an illustration showing a torque order value in an engine forcible stop control mode;

DETAILED DESCRIPTION

Figure 4:
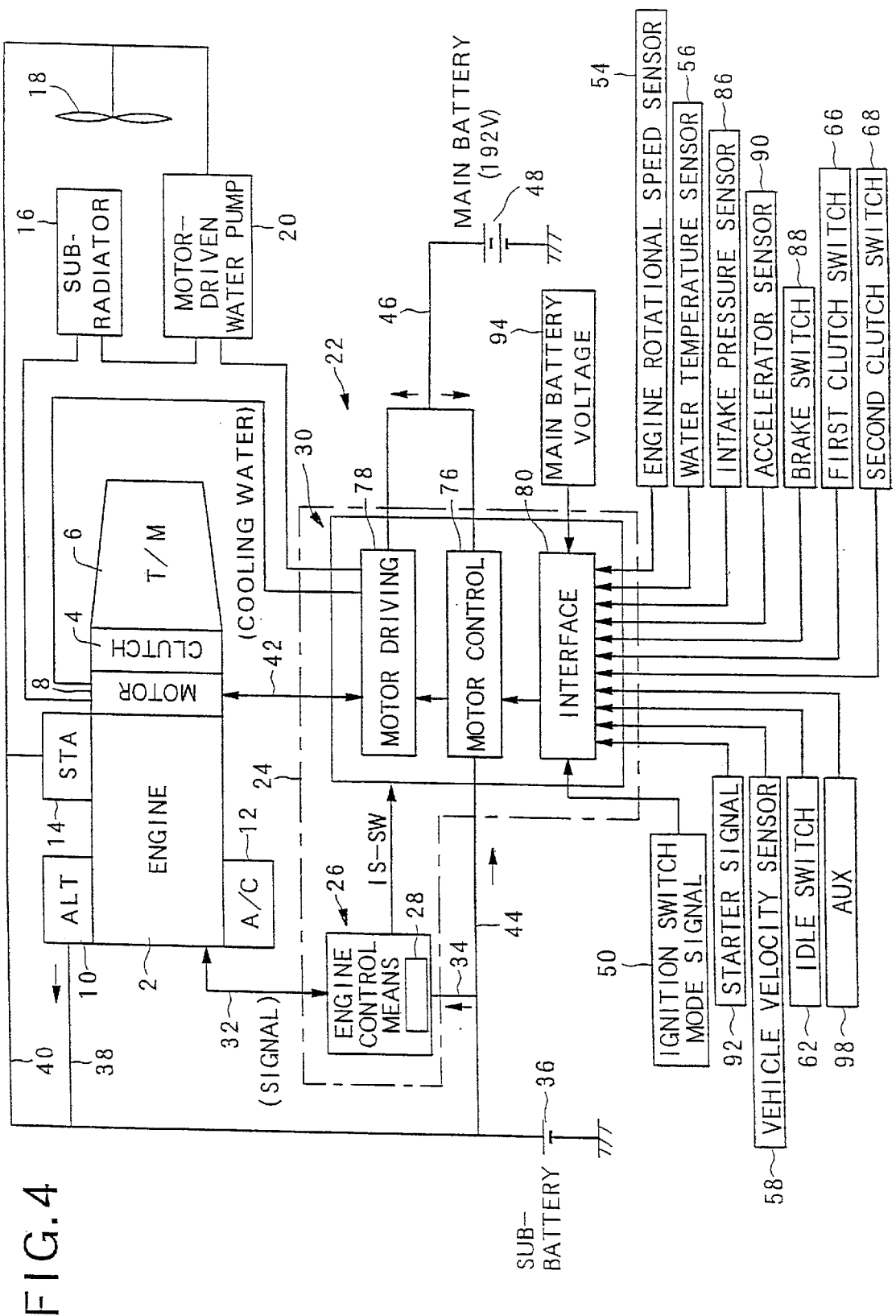
FIG. 4 is a block diagram showing a system of a control apparatus.

An explanation will be given of embodiments according to the invention in reference to the drawings as follows. FIGS. 1–7 show embodiments according to the invention. In FIG. 4, reference numeral 2 denotes an engine mounted on a vehicle (not shown); 4 a clutch; and 6 a manually operated transmission. The transmission 6 is directly connected to the engine 2 through the clutch 4. The transmission 6 builds in a gearing gear of more than one-grade, for example, a gearing gear of a five-grade system (not shown).

An electric motor 8 (The following is described as "motor") having a driving function and a power generating function is directly connected to the engine 2. The motor 8 is directly connected to a side of a flywheel of a crank shaft (not shown) of the engine 2. Incidentally, the motor 8 may be directly connected to a side of a crank sprocket of the crank shaft. The motor 8 has a rotor and a stator coil.

The engine 2 includes an alternator 10 for power-generation, an air-compressor 12 for an air-conditioner, a starter motor 14 for starting up the vehicle, a sub-radiator fan 18 of a sub-radiator 16 for cooling the motor 8, and an electrically-driven water pump 20. The alternator 10 and the air compressor 12 are connected to the crank shaft by pulleys and belts (not shown). The starter motor 14 is connected to the flywheel by an engagable and disengageable pinion and ring gear (not shown).

The engine 2 and the motor 8 mounted on a hybrid vehicle are controlled by a control means 24 of a control apparatus 22. The operating state of the engine 2 is controlled by an engine control means 26 of control means 24. Both an automatic start-up and an automatic stop of engine 2 are controlled by an automatic start-up/stop control section 28 built in engine control means 26.

The engine 2 is connected to the engine control means 26 through an engine-controlling signal line 32. "Line" is used herein to describe any electrical signal conduit. The engine control means 26 is linked to a sub-battery 36 through an engine control means-dedicated power line 34. The sub-battery 36 is coupled to the alternator 10 through a sub-battery charging power line 38. The sub-battery 36 is a conventional 12-volt vehicle battery.

The motor 8 is connected to the motor control means 30 through a motor-controlling signal line 42. The motor control means 30 is linked to the "sub-battery" 36 through a motor control means-dedicated sub-power line 44. The motor control means 30 is also coupled to a main battery 48 through a motor control means-dedicated main power line 46. The main battery 48 supplies driving electric power to the motor 8 and is charged by generated electric power from the motor 8.

An engine control means 26 to control the engine 2 has a fuel injection control section, ignition time control section and an ISC (idle speed control) control section (not shown). The engine control means 26 drives an injector 70 and a ignition coil/igniter 72 by a signal input from an engine rotational speed sensor 54 and a water temperature sensor 56 mentioned later. The engine control means controls a quantity of fuel injected and the ignition time of the engine 2 according to a driving state, as shown in FIG. 5.

Figure 5:
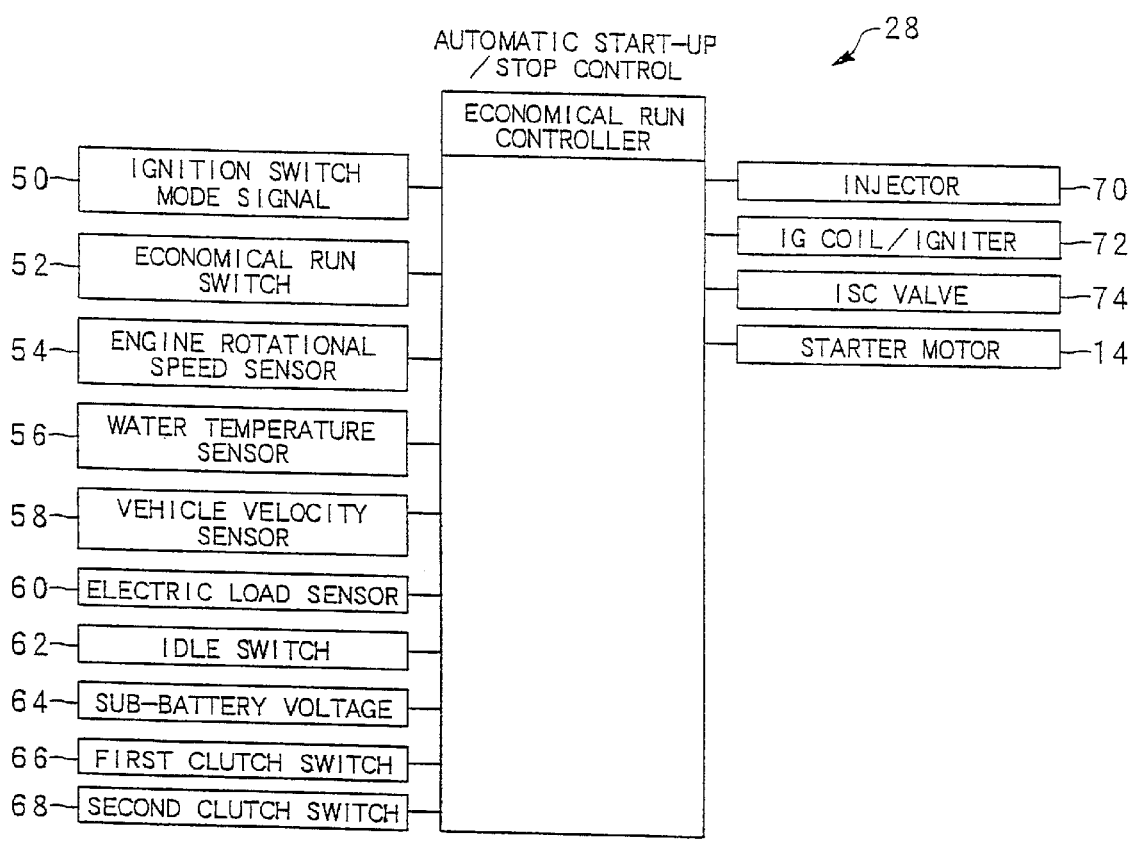
FIG. 5 is a block diagram of an automatic start-up/stop control section.

The automatic start-up/stop control section 28 built into engine control means 26, as shown in FIG. 5, connects an ignition switch 50, economical run switch 52, engine rotational speed sensor 54, water temperature sensor 56, vehicle velocity sensor 58, electric load sensor 60, idle switch 62, sub-battery voltage detecting device 64, first clutch switch 66 and second clutch switch 68 to an input side, and connections on injector 70, an ignition coil/igniter 72, an ISC valve 74 and the starter motor 14 to the output side.

The first clutch switch 66 is off when the clutch pedal (not shown) is not pressed down and the clutch 4 is fully combined. Furthermore the first clutch switch 66 closes or turns on when the clutch 4 is gradually released from a complete combination state by pressing down the clutch pedal until the clutch is placed in a half combination state. The first clutch switch 66 is on until the clutch 4 reaches a complete release state when the clutch pedal is fully pressed down.

The second clutch switch 68 is off when the clutch pedal is fully pressed down and the clutch 4 is fully released. Furthermore the second clutch switch 68 remains on when the clutch pedal is returned from the state fully pressed down and is placed in a half combination state. The second clutch 4 remains on until the clutch 4 reaches a complete combination state when the clutch pedal is fully returned.

The automatic start/stop control section 28, determines both automatic tart-up and automatic stop conditions by a signal input from the ignition switch 50 and an economical run switch 52. When both the automatic start-up and automatic stop conditions are satisfied or not satisfied, the automatic start-up/stop control section 28 controls to drive or stop injector 70, ignition coil/igniter 72, ISC valve 74 and starter motor 14, respectively, and therewith controls to automatically start up and stop the engine 2.

Figure 6:
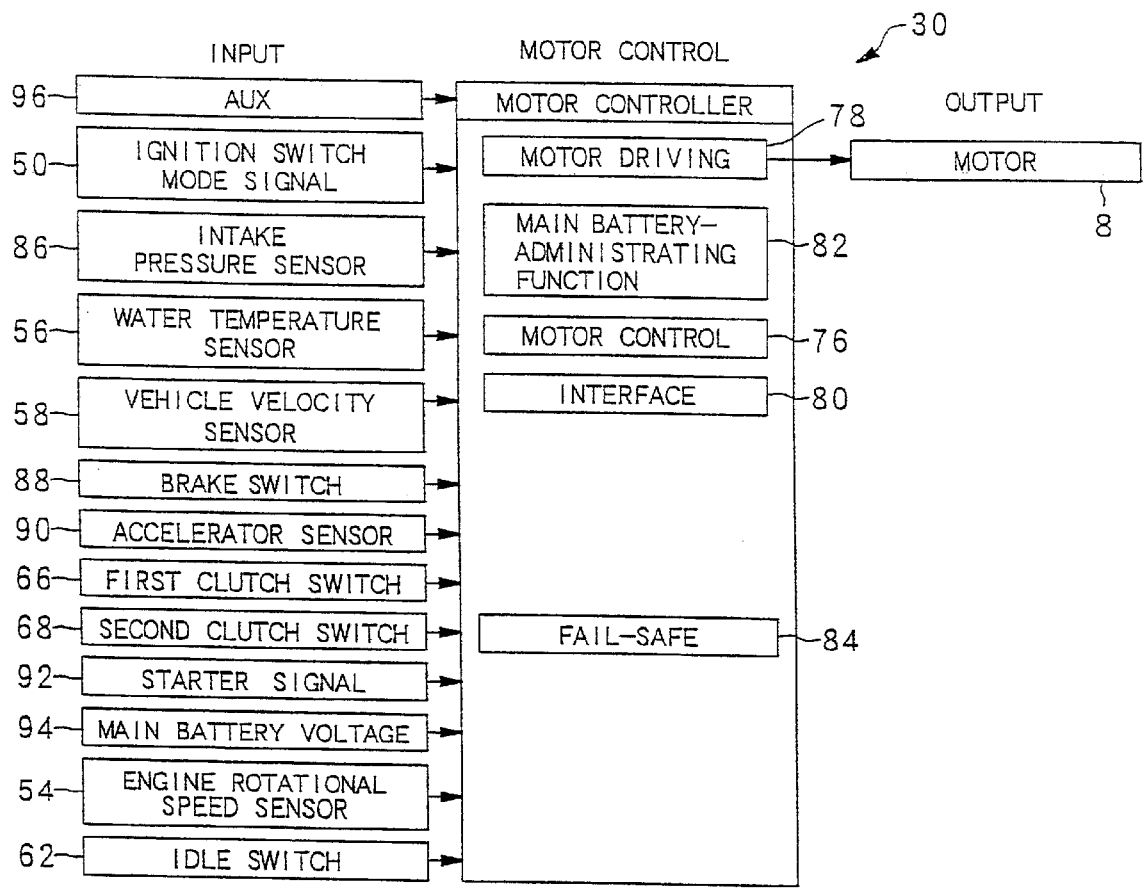
FIG. 6 is a block diagram of a motor control means.

The motor control means 30 to control the motor 8, as shown in FIG. 6, includes motor control section 76, motor drive section 78, input/output processing section (interface) 80, main battery administrating section 82 and a fail-safe section 84.

The motor control means 30 connects ignition switch 50, intake pressure sensor 86, water temperature sensor 56, vehicle velocity sensor 58, brake switch 88, accelerator sensor 90, first clutch switch 66, second clutch switch 68, starter switch 92, main battery voltage detector 94, engine rotational speed sensor 54, idle switch 62 and auxiliary input (AUX) 96 to input side, and connects motor 8 to an output side.

Figure 7:
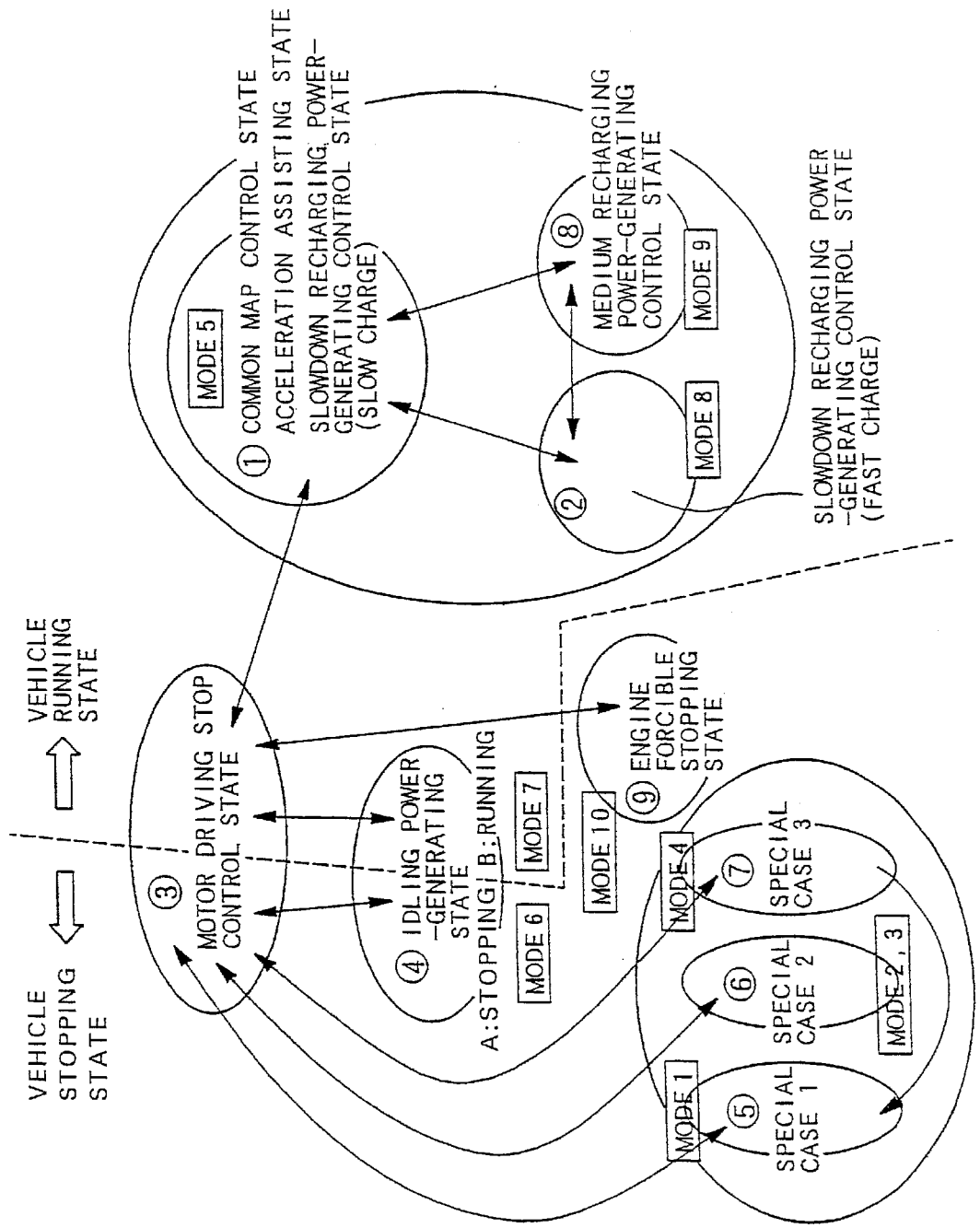
FIG. 7 is a diagram showing switchover of a control state.

The motor control means 30 controls both motor driving and power-generating states of motor 8 based on driving states of engine 2 and the hybrid vehicle. Control states of motor 8 by motor control means 30, as shown in FIG. 7, are from the following nine kinds of states (1–9).

(1) common map about acceleration assist and slowdown recharging power generating control state (slow charge): mode 5;

(2) slowdown recharging power-generating control state (fast charge); mode 8;

(3) motor driving stop control state (state waiting whether each switchover condition is satisfied);

(4) idling power-generating control state; mode 6 (A: during stop) and mode 7 (A: during traveling);

(5) special case control 1 (starting assist): mode 1;

(6) special case control 2 (start-up assist): mode 2 (waiting) and mode 3 (executing);

(7) special case control 3 (idle rotational speed stabilization assist): mode 4;

(8) medium recharging power-generating control state; mode 9; and (9) engine forcibly stopped control state: mode 10.

Switchover of the control states, based on a driving state of a vehicle, is executed as follows.

1. During execution of control states of (1), (2), (4) and (8), when condition switching over to control states of (5), (6), (7) and (9) are satisfied, the control states of (1), (2), (4) and (8) are removed forcibly, and the control states of (5), (6) and (7) are switched over through motor driving stop state of control state (3).

2. Special case control 1 and 2 (states (5) and (6)) do not directly switch over to other special case control 3 (state (7)).

3. After switching over, control states (5), (6), (7) and (9) do not switch over to other control conditions until a removing condition is satisfied. But, in special case control 3 (state (7)), when a switchover condition to special case control 1 (state (5)) is satisfied before a removing condition is satisfied, the special case control 3 is switched over to special case control 1 (state (5)).

As shown in FIG. 7, the motor control means 30, by a signal output from ignition switch 50 and intake pressure sensor 84, controls both driving and electric power-generating states of motor 8 according to the various control states based on a driving state of the engine 2 and a driving state of the hybrid vehicle.

Thus, by the control means 24, the control unit 22 of a hybrid vehicle controls both driving and power-generating states of a motor 8 based on a driving state of a hybrid vehicle and a driving state of the engine 2, and controls to automatically start up and stop the engine 2 according to an automatic start-up condition and an automatic stop condition.

The motor control means 30 of the control means 24 controls both driving and power-generating states of the motor 8 independent of the engine control means 26 of the engine 2. In addition, the motor control means 30 receives only both automatic start-up and stop order signals (idle stop signal: "ON" and "OFF" of IS-SW) for informing whether both automatic start-up and stop conditions are satisfied or are not satisfied from engine control means 26 having automatic start-up/stop control section 28 built-in. Therefore, when engine 2 automatically stops after the automatic stop condition is satisfied, then the motor control means 30 controls motor 8 so as to execute battery recharging power-generating drive. Furthermore, in the case of automatically stopping engine 2 after a satisfied automatic stop condition, motor control means 30 controls to stop the recharging power-generating drive of motor 8 when the engine rotational speed becomes about zero.

Operation of this embodiment is described next.

Figure 1:
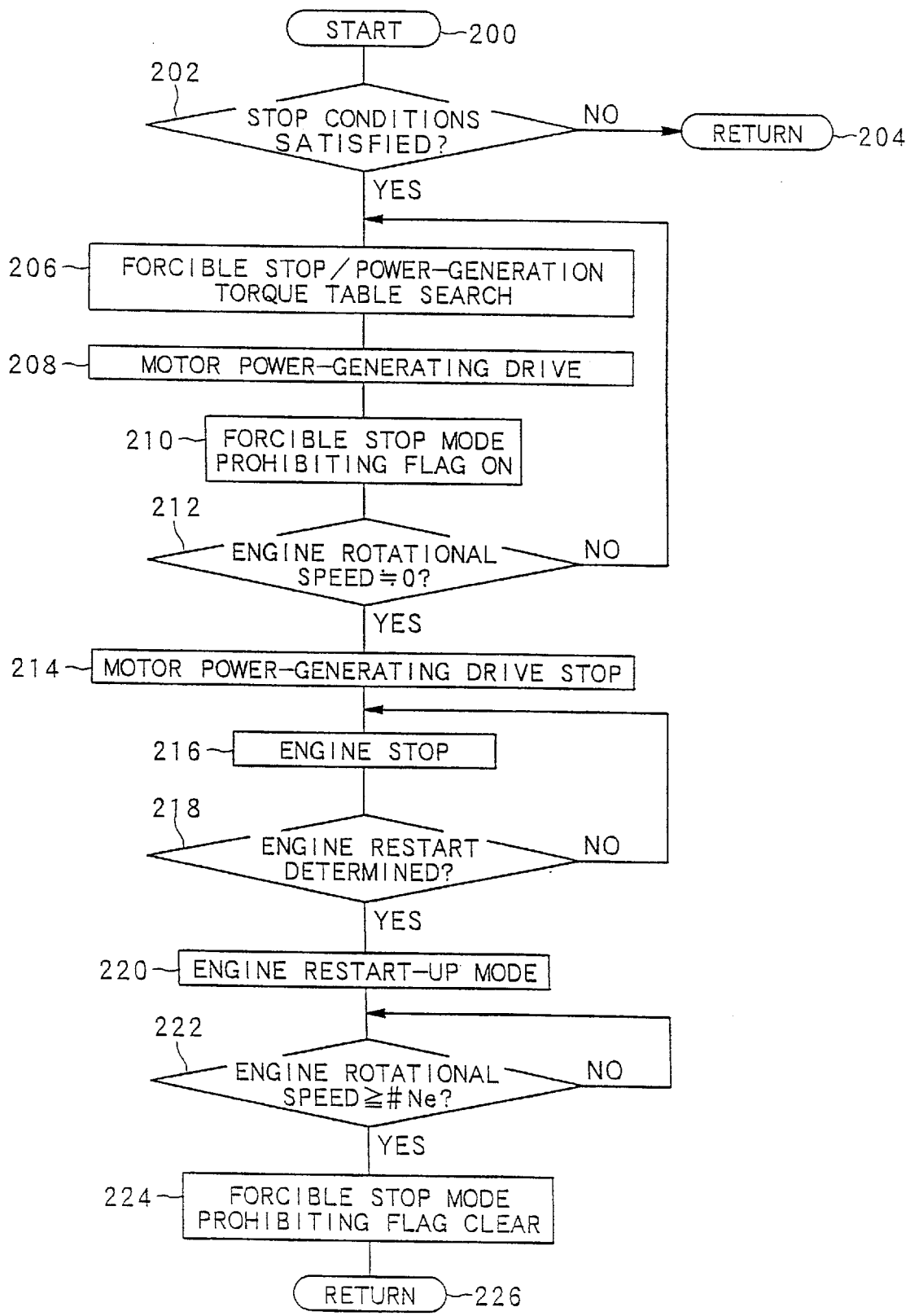
FIG. 1 is a control flowchart of a control apparatus for a hybrid vehicle showing an embodiment of the present invention.

Referring now to FIG. 1, the control means 22 for a hybrid vehicle starts control at step 200 using the motor control means 30. Then a determination is made at step 202 as to whether an automatic stop order signal (idle stop signal: "ON" of IS-SW) for informing from the engine control means 26 that automatic stop conditions are satisfied is output.

When the determination in step 202 results in "NO", then the routine is returned by step 204, and the determination in step 202 is repeated.

When the determination in step 202 results in "YES", then the routine is shifted to engine forcibly stopped control (mode 10) because the engine 2 is automatically stopped after the automatic stop condition is satisfied, as shown in FIG. 2. FIG. 2 illustrates the specific switchover/remove conditions for an engine forcible stop control mode. The conditions sensed are vehicle velocity, motor rotational speed, the clutch switches SW1, SW2, the brake switch, idle switch, starter switch, idle stop signal IS-SW and engine water temperature.

The engine forcible stop control is indicated by a prohibiting flag. A prohibiting "ON" condition occurs when engine forcible stop control is excused.

A torque determining value corresponding to engine rotational speed is searched for by the torque table of FIG. 3 at step 206. Therewith, by this searched torque determining value, the routine executes a recharging power-generating drive of motor 8 at step 208 to charge the main battery, and load the engine 2. When a flag of an engine forcibly stopped controlling prohibition has become on at step 210, then a determination is made at step 212 as to whether engine rotational speed is nearly zero (engine rotational speed approximates 0 rpm). The torque order or torque value processing shown in FIG. 3 controls loading of the motor to obtain a desired power generating drive from the motion to minimize vehicle stopping time and maximize charging of the battery 48.

When the determination in step 212 results in "NO", then the routine is returned to processing at step 206. When the determination in step 212 results in "YES", for example, when engine rotational speed is less than 300 rpm, the engine forcibly stopped control state (mode 10) is removed.

The recharging power-generating drive of the motor 8 is stopped at step 214, and the engine 2 is automatically stopped at step 216.

During automatic stop of the engine 2, a determination is made at step 218 as to whether the automatic stop order signal (idle stop signal: "OFF" of IS-SW) for informing from the engine control means 26 that automatic stop conditions are satisfied is no longer output.

When the determination in step 218 results in "NO", then the routine is returned to processing at step 216. When the determination in step 218 results in "YES", then the routine is shifted to special case control 2 (mode 2 and 3) for restarting up engine 2 because engine 2 is automatically started up at step 220 after the automatic start-up condition is satisfied. A determination is made at step 222 as to whether the engine rotational speed is more than a set rotational speed (engine rotational speed greater than or equal to #Ne).

When the determination in step 222 results in "NO", then the determination in step 222 is repeated. When the determination in step 222 results in "YES" then the flag of the engine forcibly stopped controlling prohibition is cleared. Thus prohibiting "CLEAR" condition exists when engine rotational speed (after engine is restarted) is greater than a fixed speed, such as 1100 rpm. Therewith, the routine is returned to step 226.

Thus, the control apparatus 22 of the hybrid vehicle, when automatically stopping the engine 2 after an automatic stop condition is satisfied, controls motor 8 so as to execute a battery recharging power-generating drive, according to a torque determining value corresponding to engine rotational speed. Then, by power-generating drive of the motor 8 for automatic stop of the engine 2, the engine is given a load corresponding to an engine rotational speed and the engine rotational speed drops rapidly. Accordingly, the engine 2 cannot run idle by inertia. Therefore, this arrangement can decrease the fuel sticking in an intake port (not shown) of the engine 2 being drawn into a cylinder. Fuel can remain in the intake port instead.

Therefore, because the engine 2 is idling at an automatic stop of the engine 2, the control apparatus 22 of a hybrid vehicle can quickly stop the hybrid vehicle. And, because a time period up to stopping of engine 2 can be shortened, a sensation from stopping of the vehicle can be improved. In addition, as the drawing and sticking of fuel in the fuel intake port because of running at idle can be decreased, discharge of unburned combustible gas can be prevented. Furthermore, because fuel can remain in the intake port, fast explosion at automatic start-up after automatic stop can be hastened. Therefore, starting-up performance of a hybrid vehicle is improved.

Moreover, this control apparatus 22 of a hybrid vehicle, when engine rotational speed has become nearly zero, controls to stop power-generating drive of the motor 8. Accordingly, the control apparatus 22 can get rid of a load from the motor 8 just before stopping the engine 2 and can let the engine stop smoothly. As a result, a sensation or feeling during stopping can be improved.

Furthermore, this invention is not limited to the above-mentioned embodiments but is suitable to many possible innovations and applications. For example, in the above-mentioned embodiment, power-generating drive of the motor 8 was considered as a load on the engine 2. However, by driving the air-conditional compressor 12, a control apparatus may also give the compressor driving force to the engine 2 as a load.

Thus, the control apparatus for hybrid vehicles in this invention, when automatically stopping an engine, can prevent the engine from idling by inertia, and can decrease fuel in an intake port of the engine being drawn into a cylinder, so that the fuel can remain instead in the intake port.

Therefore, because the engine is run idle during automatic stop of the engine, the control apparatus of a hybrid vehicle can quickly stop the hybrid vehicle. And, because a time period for stopping the engine can be shortened, a feeling from stopping the vehicle can be improved. In addition, as drawing of fuel sticking in the intake port because of running idle is decreased, discharge of unburned combustible gas is prevented or minimized. Furthermore, because more fuel can remain in the intake port, fast explosion at automatic start-up, after automatic stop, can be realized. Therefore, starting-up performance of a hybrid vehicle can be improved.

What is claimed is:

1. A control apparatus for a hybrid vehicle having an engine and an electric motor disposed therein, the electric motor having both driving and power-generating functions to directly connect to the engine mounted on the hybrid vehicle, comprising: a control apparatus for a hybrid vehicle, which controls both driving and power-generating states of said motor based on a driving state of said hybrid vehicle and a driving state of said engine, and controls to automatically start up and stop the engine according to an automatic start-up condition and an automatic stop condition, wherein when the engine automatically is stopped after said automatic stop condition is satisfied, the control means controls the motor so as to execute a recharging power-generating drive.

2. A control apparatus for a hybrid vehicle as defined in claim 1, wherein said motor control means provides control to stop said power-generating drive of said motor when engine rotational speed becomes nearly zero, when the engine automatically stops.

* * * * *